UNITED STATES PATENT OFFICE

JAN AL, OF AMSTERDAM, NETHERLANDS, ASSIGNOR TO NAAMLOOZE VENNOOTSCHAP DE BATAAFSCHE PETROLEUM MAATSCHAPPIJ, OF THE HAGUE, NETHERLANDS

PROCESS FOR ABSORPTION OF CARBON DIOXIDE FROM GASES AND VAPORS

No Drawing. Application filed February 20, 1930, Serial No. 430,108, and in the Netherlands February 26, 1929.

My invention relates to a process for the manufacture of mixtures of gases or vapors with lower carbon-dioxide content from mixtures of gases or vapors with higher carbon-dioxide content and for the absorption of carbon-dioxide from gases and vapors.

The principle of the invention can be applied to all possible kinds of gases containing carbonic acid, though the thought underlying the invention was more especially the removal of carbon-dioxide from gas mixtures which are obtained from hydrocarbons such as methane by incomplete combustion or conversion with steam.

A known method of manufacturing hydrogen consists in the incomplete combustion or conversion with steam of hydro-carbons. In both cases a mixture is obtained consisting of hydrogen, carbon-monoxide and any non-converted hydrocarbon and containing, in addition, carbon dioxide and water vapor.

When the conversion with steam is carried out in two stages or when the hydrogen is produced by incomplete combustion followed by reaction between the CO and steam to form hydrogen, it is of importance to remove the carbon dioxide from the gas mixture developed after the first stage or after the incomplete combustion, or at least to keep the percentage of $CO_2$ as low as possible, because in the further formation of hydrogen from CO and steam, $CO_2$ is formed.

$$CH_4 + 2H_2O = CO_2 + 4H_2$$
$$CO + H_2O = CO_2 + H_2$$

so that in order to displace the equilibrium of reaction to the right it is essential that the $CO_2$ already present is made as low as possible.

Seeing that in both cases steam is already present in the gas mixture a method has been sought for the removal of carbon dioxide which can be carried out without condensing the steam, a condition which, as will be understood, is of great importance for the reactions in question.

This problem has now been completely solved by using fixed alkali-carbonate, and steam in excess of equimolecular proportions. The following reaction takes place:

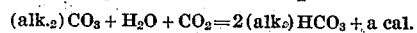

in which alk. represents an alkaline metal.

The principle of the process according to the invention consists in the gases and/or vapors containing carbon dioxide being brought into contact, together with excess of steam, with fixed alkali-carbonate or substances containing alkali-carbonate at elevated temperature above the condensing point of steam and with or without the application of pressure.

For $KHCO_3$ the pressure of $CO_2$ and $H_2O$ ($P_{CO_2} + P_{H_2O}$) together at 110° C. amounts to about 8 cm. mercury. At first sight it would, therefore, be expected that in this manner no more $CO_2$ could be removed from the gases than up to a $CO_2$ percentage corresponding to a $CO_2$ pressure of 4 cm., or about 5% calculated on gas and steam together. The $CO_2$ pressure is determined, however, by the product of $P_{CO_2} \times P_{H_2O}$, which at 110° C., expressed in cm. mercury pressure, is:

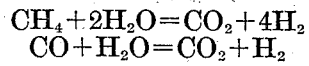

Beginning, for instance, with 1 volume part $CO_2$ and 2 volume parts steam, thus a two-fold excess of steam, when ½ volume part $CO_2$ is absorbed there will still be 1½ volume parts steam, thus a three-fold excess of steam. In other words, as $CO_2$ is removed from the gas mixture so the excess of steam becomes greater. Consequently when almost all the $CO_2$ has been absorbed and the quantity of steam is say ¼ atmosphere, or about 19 cm. mercury pressure, then the $CO_2$ pressure will be $\frac{15}{16}$, thus less than 1 cm. mercury pressure.

From this theoretical deduction it follows, therefore, that with the process according to the invention practically all the $CO_2$ can be removed from a gas mixture and application in practice has shown this indeed to be the case.

*Example*

A tube is charged with potassium carbonate precipitated on pumice stone (made by adding pumice stone to an aqueous solution of $K_2CO_3$ and then drying by evaporation) or with a mass obtained by mixing for instance pumice stone and the like with pulverulent carbonate. The mass put into the tube weighs 66.5 grammes and contains about 16 grammes $K_2CO_3$. This mass is kept at a temperature of 110° C. or higher while a gas containing 17% $CO_2$ (calculated on dry gas) is conducted through it after previously being passed through boiling or practically boiling water. When the gas is passed through the tube at higher speeds it is found that the temperature of the absorbent mass is increased by the heat developed in the reaction.

| Temperature of absorbent mass in the tube in °C. | Speed at which the gases pass through the tube in litres per hour | Per cent $CO_2$ after absorption, calculated on dry gas |
|---|---|---|
| 110–115 | 5 | Traces. |
| 115–118 | 10 | Traces. |
| 122 | 20 | 0.8 |
| 116 | 20 | 1.1 |

As soon as the quantity of carbon dioxide approaches the theoretically possible limit the $CO_2$ passes through without being absorbed, but before this occurs practically all the $CO_2$ is absorbed, as appears from the figures given above. The alkali-bicarbonate can be regenerated in various ways, for instance by applying a vacuum at elevated temperature or by passing through a current of air. Regeneration can be effected very quickly according to the invention by conducting through the mass at elevated temperature (dried) ammonia gas, whereby principally the following reaction takes place:

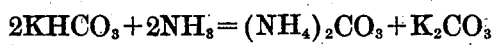

$$2KHCO_3 + 2NH_3 = (NH_4)_2CO_3 + K_2CO_3$$

In this manner at a temperature of about 180° C. the $KHCO_3$ can be very quickly regenerated; at lower temperatures the process takes place more slowly.

If for some reason or other it is not desired or it is impossible to use ammonia for this purpose, then it is recommendable to carry out the regeneration at a somewhat higher temperature, say 220° C., by conducting through air or some other suitable inert gas or vapor, or by applying a vacuum, or by using a combination of these methods.

Instead of potassium carbonate also other alkali carbonates will serve, as for instance sodium carbonate, but then the absorption should preferably be carried out under pressure. Absorption with $K_2CO_3$ can also be carried out under pressure if necessary. It is obvious that the invention is by no means restricted to the example described above; for instance the necessary steam can be added to the gases also in another way if it should not be already present therein in a sufficient degree, whilst also the alkali-carbonate can be applied either as such or distributed in other carriers than pumice stone, or mixed with other substances. Further it is recommended to finely distribute the alkali-carbonate in some way or other.

As remarked above, the method described is particularly of importance for the removal of $CO_2$ from gas mixtures which contain an excess of steam and which have to be further converted with steam after the absorption, and whereby the steam, therefore, need not be condensed, such as is the case in washings under pressure, and in washings with solutions.

Another important advantage attached to the process according to the invention lies in the fact that no valuable components of the gases are assimilated in the absorbing mass, whilst for instance in pressure-washings of gas mixtures containing hydrogen, carbon monoxide and carbon dioxides up to 10% of the hydrogen present is removed from the mixture. Another fact of importance is that with an increasing steam content the rate of the $CO_2$ absorption also increases, thereby making it possible to adjust the rate of absorption as desired.

Further there is an advantage in the fact that the absorption can be carried out at relatively low temperatures, which from a point of view of economy is in some cases of great importance. In this connection it is likewise an advantage of the process according to the invention that the temperatures for absorption and for regeneration lie close together.

What I claim is:

1. The process for absorbing carbon dioxide from gases containing the same, comprising treating the gas in the presence of a solid alkali carbonate and at a temperature above the condensing temperature of steam, with steam in excess of the equimolecular quantity with respect to the carbon dioxide content of the gas.

2. The process for absorbing carbon dioxide from gases containing the same, comprising passing the gas together with steam in excess of the equimolecular quantity with respect to the carbon dioxide content of the gas through a mass containing finely distributed alkali carbonate, the temperature being maintained above the condensation temperature of steam.

3. The process for absorbing carbon dioxide from gases containing the same, comprising treating the gas in the presence of a solid alkali carbonate, at super atmospheric pressure and at a temperature above the condensing temperature of steam, with steam in excess of the equimolecular quantity with respect to the carbon dioxide content of the gas.

4. The process for absorbing carbon dioxide from gases containing the same, comprising treating the gas in the presence of a solid alkali carbonate and at a temperature above the condensing temperature of steam, with steam in excess of the equimolecular quantity with respect to the carbon dioxide content of the gas, and regenerating the alkali by subjecting it to gaseous ammonia at about 180° C.

5. The process for absorbing carbon dioxide from gases containing the same, comprising treating the gas in the presence of a solid alkali carbonate and at a temperature above the condensing temperature of steam, with steam in excess of the equimolecular quantity with respect to the carbon dioxide content of the gas, and regenerating the alkali by heating to about 220° C. and applying a vacuum.

6. The process for absorbing carbon dioxide from gases containing the same, comprising treating the gas in the presence of a solid alkali carbonate and at a temperature above the condensing temperature of steam, with steam in excess of the equimolecular quantity with respect to the carbon dioxide content of the gas, and regenerating the alkali by heating and passing an inert gas through the same.

7. The process for absorbing carbon dioxide from gases containing the same, comprising treating the gas in the presence of solid potassium carbonate and at a temperature above the condensing temperature of steam with steam in excess of the equimolecular quantity with respect to the carbon dioxide content of the gas.

8. The process for absorbing carbon dioxide from gases containing the same, comprising treating the gas in the presence of solid sodium carbonate under super atmospheric pressure and at a temperature above the condensing temperature of steam, with steam in excess of the equimolecular quantity with respect to the carbon dioxide content of the gas.

9. The process for absorbing carbon dioxide from gases containing the same, comprising treating the gas in the presence of a solid alkali carbonate at a temperature of at least 110° C. with two volumes of steam for each volume of carbon dioxide to be absorbed.

In testimony whereof, I have affixed my signature.

JAN AL.